US008876607B2

(12) United States Patent
Ng et al.

(10) Patent No.: US 8,876,607 B2
(45) Date of Patent: Nov. 4, 2014

(54) VISUAL DISPLAY OF FANTASY SPORTS TEAM STARTING ROSTER DATA TRENDS

(75) Inventors: Brian Ng, Santa Monica, CA (US); Dean Nakabayashi, Santa Monica, CA (US); Scott Pitkin, Los Angeles, CA (US); Sean Montgomery, Palo Alto, CA (US); Mark Kawakami, Burbank, CA (US); Ron Belmarch, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1096 days.

(21) Appl. No.: 11/959,442

(22) Filed: Dec. 18, 2007

(65) Prior Publication Data

US 2009/0156312 A1 Jun. 18, 2009

(51) Int. Cl.
*G06F 17/00* (2006.01)
*G07F 17/32* (2006.01)

(52) U.S. Cl.
CPC ............ *G07F 17/3237* (2013.01); *G07F 17/32* (2013.01)
USPC .................................... 463/42; 463/4; 700/91

(58) Field of Classification Search
USPC .............................. 700/91, 92; 463/4, 31, 42
See application file for complete search history.

(56) References Cited

U.S. PATENT DOCUMENTS

| | | | |
|---|---|---|---|
| 5,636,920 | A | 6/1997 | Shur et al. |
| 5,971,854 | A | 10/1999 | Pearson et al. |
| 6,041,266 | A | 3/2000 | Nickerson |
| 6,193,610 | B1 | 2/2001 | Junkin |
| 6,656,042 | B2 | 12/2003 | Reiss et al. |
| D491,956 | S | 6/2004 | Ombao et al. |
| D499,740 | S | 12/2004 | Ombao et al. |
| D510,362 | S | 10/2005 | Minagawa et al. |
| D538,295 | S | 3/2007 | Noviello et al. |
| D538,815 | S | 3/2007 | Noviello et al. |
| D538,816 | S | 3/2007 | Noviello et al. |
| D538,817 | S | 3/2007 | Noviello et al. |
| D538,818 | S | 3/2007 | Noviello et al. |
| D549,717 | S | 8/2007 | Noviello et al. |

(Continued)

OTHER PUBLICATIONS

Heads Up! CBS SportsLine Dominates Fantasy Football in 2006. CBSSports.com Press Release [online]. Aug. 7, 2006 [retrieved Mar. 1, 2011]. Retrieved from the Internet: <URL:http://www.cbssports.com/info/aboutus/press/2006/fanfoot06>.*

(Continued)

*Primary Examiner* — Dmitry Suhol
*Assistant Examiner* — Carl V Larsen
(74) *Attorney, Agent, or Firm* — James J. DeCarlo; Greenberg Traurig, LLP

(57) ABSTRACT

An interface for displaying statistical information about players in an online fantasy sports game is provided. The interface includes a statistics generator for providing for display at least one description component that comprises at least a name of at least one player for viewing by a user. The statistics generator also provides at least one indicator for displaying a rendition of a statistic associated with the at least one player, where the statistic is based upon a percentage of teams for which the at least one player has a defined status in the fantasy sports game. The interface also includes an update component for providing for an update of the rendition of the statistic at one or more defined times, wherein the update component is operable to provide for display a value of the statistic determined at an update time, wherein the update time is based upon the one or more defined times.

53 Claims, 5 Drawing Sheets

(56) References Cited

U.S. PATENT DOCUMENTS

| | | | | |
|---|---|---|---|---|
| D550,233 | S | 9/2007 | Vigesaa | |
| D550,241 | S | 9/2007 | Viegers et al. | |
| D551,675 | S | 9/2007 | Noviello et al. | |
| D554,653 | S | 11/2007 | Noviello et al. | |
| D557,702 | S | 12/2007 | Viegers et al. | |
| D558,213 | S | 12/2007 | Noviello et al. | |
| D559,259 | S | 1/2008 | Noviello et al. | |
| D559,260 | S | 1/2008 | Noviello et al. | |
| D569,869 | S | 5/2008 | Chotai et al. | |
| D571,373 | S | 6/2008 | Loehr et al. | |
| D572,717 | S | 7/2008 | Loehr et al. | |
| D579,943 | S | 11/2008 | Clark et al. | |
| D594,012 | S | 6/2009 | Ng et al. | |
| D594,464 | S | 6/2009 | Ng et al. | |
| 7,614,944 | B1 * | 11/2009 | Hughes et al. | 463/4 |
| 7,699,707 | B2 * | 4/2010 | Bahou | 463/42 |
| 2002/0040253 | A1 | 4/2002 | McNally et al. | |
| 2005/0228780 | A1 | 10/2005 | Diab et al. | |
| 2006/0183548 | A1 | 8/2006 | Morris et al. | |
| 2006/0217198 | A1 | 9/2006 | Johnson | |
| 2006/0252476 | A1 * | 11/2006 | Bahou | 463/4 |
| 2007/0021165 | A1 * | 1/2007 | Ma et al. | 463/1 |
| 2007/0185599 | A1 | 8/2007 | Robinson et al. | |
| 2007/0233585 | A1 * | 10/2007 | Ben Simon et al. | 705/35 |
| 2007/0243917 | A1 | 10/2007 | Wojewoda et al. | |
| 2007/0243918 | A1 | 10/2007 | Wojewoda et al. | |
| 2008/0026804 | A1 | 1/2008 | Baray et al. | |
| 2008/0033840 | A1 | 2/2008 | Upendran et al. | |
| 2008/0096664 | A1 | 4/2008 | Baray et al. | |
| 2008/0102911 | A1 | 5/2008 | Campbell et al. | |
| 2008/0147575 | A1 | 6/2008 | Roy | |
| 2008/0153589 | A1 | 6/2008 | Baray et al. | |
| 2008/0155436 | A1 | 6/2008 | Hirano et al. | |
| 2008/0268951 | A1 * | 10/2008 | Gropp et al. | 463/31 |
| 2009/0156312 | A1 | 6/2009 | Ng et al. | |

OTHER PUBLICATIONS

Fleaflicker Tour. Fleaflicker Free Fantasy Football [online]. Oct. 22, 2006, [retrieved on Feb. 28, 2011]. Retrieved from the Internet <URL:http://web.archive.org/web/20061022103948/http://www.fleaflicker.com/>.*

Fantasy Baseball '02 Most Added/Dropped. ESPN.com [online]. Sep. 17, 2002 [retrieved Mar. 1, 2011]. Retrieved from the Internet <URL:http://replay.waybackmachine.org/20021017152631/http://games.espn.go.com/cgi/flb/tea/addeddropped>.*

CBSSports Customer Help Page. "What do the categories % Owned and % Started mean?". Online. Sep. 8, 2005. Retrieved from the Internet. Retrieved Nov. 21, 2011. <URL:https://cbssports.custhelp.com/app/answers/detail/a_id/402/~/what-do-the-categories-%25-owned-and-%25-started-mean%3F>.*

Anonymous. (2000). Y! Sports Screen Shot of Fantasy Baseball Home Page, 1 page.

Anonymous. (Sep. 29, 2004). Y! Sports (ID#101) GMC Fantasy Baseball Plus Screen Shot, 1 page.

Non-Final Office Action mailed on Dec. 12, 2007, for U.S. Appl. No. 11/406,663, 7 pages.

Non-Final Office Action mailed on Jun. 17, 2009, for U.S. Appl. No. 11/406,663, eight pages.

TurboStats Software Company. (Mar. 6, 2001). "Drag & Drop Field Layout," <http://web.archieve.org/web/20001041822042O/http://www.turbostats.com/baseline.htm> last visited on Jun. 11, 2009, three pages.

Waybackmachine. (Jun. 11, 2009). "Internet Archive WayBack Machine, <http://web.archive.org/web/*/http://www.turbostats.com/baseline.htm>," last visited on Jun. 11, 2009, one page.

* cited by examiner

VISUAL DISPLAY OF FANTASY SPORTS TEAM STARTING ROSTER DATA TRENDS

BACKGROUND

1. Field

The present application relates generally to online fantasy sports games, and more particularly to an interface for displaying information about teams and players in online fantasy sports games.

2. Related Art

In online fantasy sports games, such as fantasy football, baseball, hockey, golf, and automobile racing, a user can create a fantasy team. The fantasy team includes fantasy players that are based upon real-life players. The user's fantasy team may compete against fantasy teams of other users. An online fantasy sports game typically includes a player selection phase followed by a game play phase. Ordinarily, the player selection phase occurs between real-life games, and the game play phase occurs during real-life games. The game play phase typically occurs on game days, which are days on which real-life sports games are played. Statistics of players in the real-life games, such as points scored by each of the players, are used to determine the winners of the online fantasy games. The users of online fantasy sports games are typically users of an online service.

The users may access the fantasy sports games via a computer-based interface, such as a Web site. In the games, each fantasy player typically corresponds to a real-life sports player, and the fantasy player may have the same name and statistics as a real-life sports player. The statistics may include an average number of points scored per game and other measures of performance. A user chooses a limited number of players for a team with the goal of creating a team that will score the most points. The points scored by a team are ordinarily calculated as the sum of the points scored in a real-life game by the real-life players corresponding to the active fantasy players on the team. Therefore each fantasy game takes place on the same day as a corresponding real-life game.

To make good decisions about which players to add to their teams, users should be able to quickly access statistical information about the sports players. Therefore it would be desirable to present statistical information in a format that informs the user of statistical trends related to fantasy sports players at a glance.

SUMMARY

In general, in a first aspect, the invention features an apparatus for displaying statistical information about players in an online fantasy sports game. The apparatus includes statistics generation logic for providing for display to a user at least a name of at least one player, wherein the statistics generation logic is further operable to provide for display a rendition of a statistic associated with the at least one player, wherein the statistic is based upon a percentage of teams for which the at least one player has a defined status in the fantasy sports game, and update logic for providing for an update of the rendition of the statistic at one or more defined times, wherein the update logic is operable to provide for display a value of the statistic determined at an update time, wherein the update time is based upon the one or more defined times.

Embodiments of the invention may include one or more of the following features. The statistic may correspond to a percentage of fantasy sports teams that have the at least one player on their roster, and the status comprises an owned status, a starting status, or a combination thereof. The statistics generation logic may be operable to provide for display the at least one player in a top players list, and the at least one player is selected from at least one team in the fantasy sports game. The at least one player may be selected from all teams in the fantasy sports game. The apparatus may further comprise sport-specific position selector logic for receiving selection of a selected sport-specific position, wherein the statistics generation logic is operable to provide for display the at least one player in the top players list if the at least one player's sport-specific position corresponds to the selected sport-specific position. The statistics generation logic may be operable to provide for display the top players list in response to selection of a top players selection component.

The at least one description component may be displayed as at least one row in a table, where the at least one row includes the at least one statistic, and the table is displayed in sorted order, wherein the table is sorted by the at least one statistic. A login identity may be associated with the user, where the login identity is associated with at least one fantasy sports team of the user, and the at least one player is a member of the at least one fantasy sports team of the user. The user may be logged in to the online fantasy sports game. The statistics generation logic may provide for display the at least one player in a starting players list if the at least one player is in a starting lineup of the at least one fantasy sports team of the user. The statistics generation logic may provide for display the at least one player in a benched players list if the at least one player has a benched status on the at least one fantasy sports team of the user. The statistics generation logic may provide for display the starting players list, the benched players list, or a combination thereof, in response to selection of a top players selection component. The statistic may include a percent owned value, and the percent owned value may be based upon a percentage of teams that have the at least one player on their roster. The percent owned value may be calculated as the number of teams that have the at least one player on their roster divided by the number of teams in the fantasy sports game. The statistic may comprise a percent starting value, and the percent starting value may be based upon a percentage of teams that have the at least one player in a starting position. The percent starting value may be calculated as the number of teams that have the at least one player in a starting position divided by the number of teams in the fantasy sports game.

The apparatus may further include user teams selector logic for causing the apparatus to display the at least one description and associated statistic if the corresponding player is on a team owned by the user; and top players selection logic for causing the apparatus to display the at least one description and associated statistic if the corresponding player is a top player. The apparatus may further include note presentation logic for displaying a note component visually associated with the name of at least one player, wherein the note presentation logic is operable to provide for display information describing the at least one player in response to user selection of the note component.

In general, in a second aspect, the invention features an apparatus for displaying statistical information about players in an online fantasy sports game. The apparatus includes statistics generation logic for causing display of a player table that includes at least one row, wherein the at least one row represents at least one player, the at least one row includes at least one column, and the at least one column includes a description column for displaying a description of the at least one player, wherein the description comprises at least a name of the at least one player; and at least one indicator for displaying a rendition of a statistic associated with the at least one player, where the statistic is based upon a percentage of teams for which the at least one player has the status in the fantasy sports game, and update logic for providing for update of the rendition of the statistic at one or more defined times, where the update logic is operable to provide for display a value of the statistic determined at an update time, where the update time is based upon the one or more defined times.

Embodiments of the invention may include one or more of the following features. The statistic may correspond to a percentage of fantasy sports teams that have the at least one player on their roster, and the status may include an owned status. The statistic may correspond to a percentage of fantasy sports teams that have the at least one player on their starting roster, and the status may include a starting status. The statistics generation logic may be operable to sort the at least one row of the player table by the statistic. The player table may comprise a starters table, the starters table comprises at least one starter row, and the at least one starter row represents a corresponding fantasy player that is in a starting position on at least one team associated with a logged-in user. The player table may further include a bench table, where the bench table includes at least one bench row, and the at least one bench row represents a corresponding fantasy player that is in a bench position on at least one team associated with the logged in user. The statistics generation logic may provide for display the at least one player in a top players list, where the at least one player is selected from at least one team in the fantasy sports game. The at least one player may be selected from all teams in the fantasy sports game. The apparatus may further include sport-specific position selector logic for receiving selection of a selected sport-specific position, where the statistics generation logic is operable to provide for display the at least one player in the top players list if the at least one player's sport-specific position corresponds to the selected sport-specific position.

In general, in a third aspect, the invention features a computer-readable medium comprising instructions for displaying statistical information about players in an online fantasy sports game, the instructions for causing display of at least one description component that includes at least a name of at least one player for viewing by a user, causing display of a rendition of a statistic associated with the at least one player, where the statistic is based upon a percentage of teams for which the at least one player has a defined status in the fantasy sports game, and causing an update of the rendition of the statistic at one or more defined times by providing for display a value of the statistic determined at an update time, where the update time is based upon the one or more defined times.

Embodiments of the invention may include one or more of the following features. The statistic may correspond to a percentage of fantasy sports teams that have the at least one player on their roster, and the status may comprise an owned status, a starting status, or a combination thereof. The instructions may further include instructions for selecting the at least one player from at least one team in the fantasy sports game, and displaying the at least one player in a top players list. The at least one player may be selected from all teams in the fantasy sports game. The computer-readable medium may further include instructions for receiving selection of a selected sport-specific position and displaying the at least one player in the top players list if the at least one player's sport-specific position corresponds to the selected sport-specific position. The computer-readable medium may further include instructions for displaying the top players list in response to selection of a top players selection component. The at least one description component may be displayed as at least one row in a table, where the at least one row may includes the at least one statistic, and the table is displayed in sorted order, wherein the table is sorted by the at least one statistic. A login identity may be associated with the user, the login identity may be associated with at least one fantasy sports team of the user, and the at least one player may be a member of the at least one fantasy sports team of the user.

The computer-readable medium may further include instructions for displaying the at least one player in a starting players list if the at least one player is in a starting lineup of the at least one fantasy sports team of the user. The computer-readable may further include instructions for displaying the at least one player in a benched players list if the at least one player has a benched status on the at least one fantasy sports team of the user. The computer-readable medium further comprising instructions for displaying the starting players list, the benched players list, or a combination thereof, in response to selection of a top players selection component. The statistic may include a percent owned value, where the percent owned value is based upon a percentage of teams that have the at least one player on their roster. The percent owned value may be calculated as the number of teams that have the at least one player on their roster divided by the number of teams in the fantasy sports game. The statistic may include a percent starting value, and the percent starting value may be based upon a percentage of teams that have the at least one player in a starting position. The percent starting value may be calculated as the number of teams that have the at least one player in a starting position divided by the number of teams in the fantasy sports game.

The computer-readable medium may further include instructions for causing display of the at least one description and associated statistic if the corresponding player is on a team owned by the user; and causing display of the at least one description and associated statistic if the corresponding player is a top player. The computer-readable medium may further include instructions for displaying a note component visually associated with the name of at least one player; and displaying information describing the at least one player in response to user selection of the note component.

In general, in a fourth aspect, the invention features a computer-readable medium that includes instructions for displaying statistical information about players in an online fantasy sports game, the instructions for causing display of a player table including at least one row, where the at least one row represents at least one player, the at least one row includes at least one column, and the at least one column includes a description column for displaying a description of the at least one player, where the description includes at least a name of the at least one player; and at least one indicator for displaying a rendition of a statistic associated with the at least one player, where the statistic is based upon a percentage of teams for which the at least one player has the status in the fantasy sports game, and causing an update of the rendition of the statistic at one or more defined times by providing for display a value of the statistic determined at an update time, wherein the update time is based upon the one or more defined times.

Embodiments of the invention may include one or more of the following features. The statistic may correspond to a percentage of fantasy sports teams that have the at least one player on their roster, and the status may include an owned status. The statistic may correspond to a percentage of fantasy sports teams that have the at least one player on their starting roster, and the status may include a starting status. The computer-readable medium may further include instructions for sorting the at least one row of the player table by the statistic.

The player table may include a starters table, where the starters table includes at least one starter row, and the at least one starter row represents a corresponding fantasy player that is in a starting position on at least one team associated with a logged-in user. The player table may further include a bench table, where the bench table includes at least one bench row, and the at least one bench row represents a corresponding fantasy player that is in a bench position on at least one team associated with the logged in user. The computer-readable medium may further include instructions for displaying the at least one player in a top players list, wherein the at least one player is selected from at least one team in the fantasy sports game. The at least one player may be selected from all teams in the fantasy sports game. The computer-readable medium may further include instructions for receiving selection of a selected sport-specific position and displaying the at least one player in the top players list if the at least one player's sport-specific position corresponds to the selected sport-specific position.

In general, in a fifth aspect, the invention features an interface for displaying statistical information about players in an online fantasy sports game. The interface includes a statistics generator for providing for display at least one description component that comprises at least a name of at least one player for viewing by a user, wherein the statistics generator is further operable to provide at least one indicator for displaying a rendition of a statistic associated with the at least one player, wherein the statistic is based upon a percentage of teams for which the at least one player has a defined status in the fantasy sports game. The interface also includes an update component for providing for an update of the rendition of the statistic at one or more defined times, wherein the update component is operable to provide for display a value of the statistic determined at an update time, wherein the update time is based upon the one or more defined times.

Embodiments of the invention may include one or more of the following features. The statistic may correspond to a percentage of fantasy sports teams that have the at least one player on their roster, and the status may include an owned status, a starting status, or a combination thereof. The statistics generation component may be operable to provide the at least one description component for display as at least one row in a table, where the at least one row includes the at least one statistic, and the table is displayed in sorted order, sorted by the at least one statistic.

In general, in a sixth aspect, the invention features an interface for displaying statistical information about players in an online fantasy sports game. The interface includes a player table comprising at least one row, where the at least one row represents at least one player, the at least one row includes at least one column, and the at least one column includes a description column for displaying a description of the at least one player, where the description includes at least a name of the at least one player, and at least one indicator for displaying a rendition of a statistic associated with the at least one player, wherein the statistic is based upon a percentage of teams for which the at least one player has the status in the fantasy sports game. The interface also includes an update component for providing for an update of the rendition of the statistic at one or more defined times, wherein the update component is operable to provide for display a value of the statistic determined at an update time, wherein the update time is based upon the one or more defined times.

Embodiments of the invention may include one or more of the following features. The statistic may correspond to a percentage of fantasy sports teams that have the at least one player on their roster, and the status may include an owned status. The statistic may correspond to a percentage of fantasy sports teams that have the at least one player on their starting roster, and the status may include a starting status.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
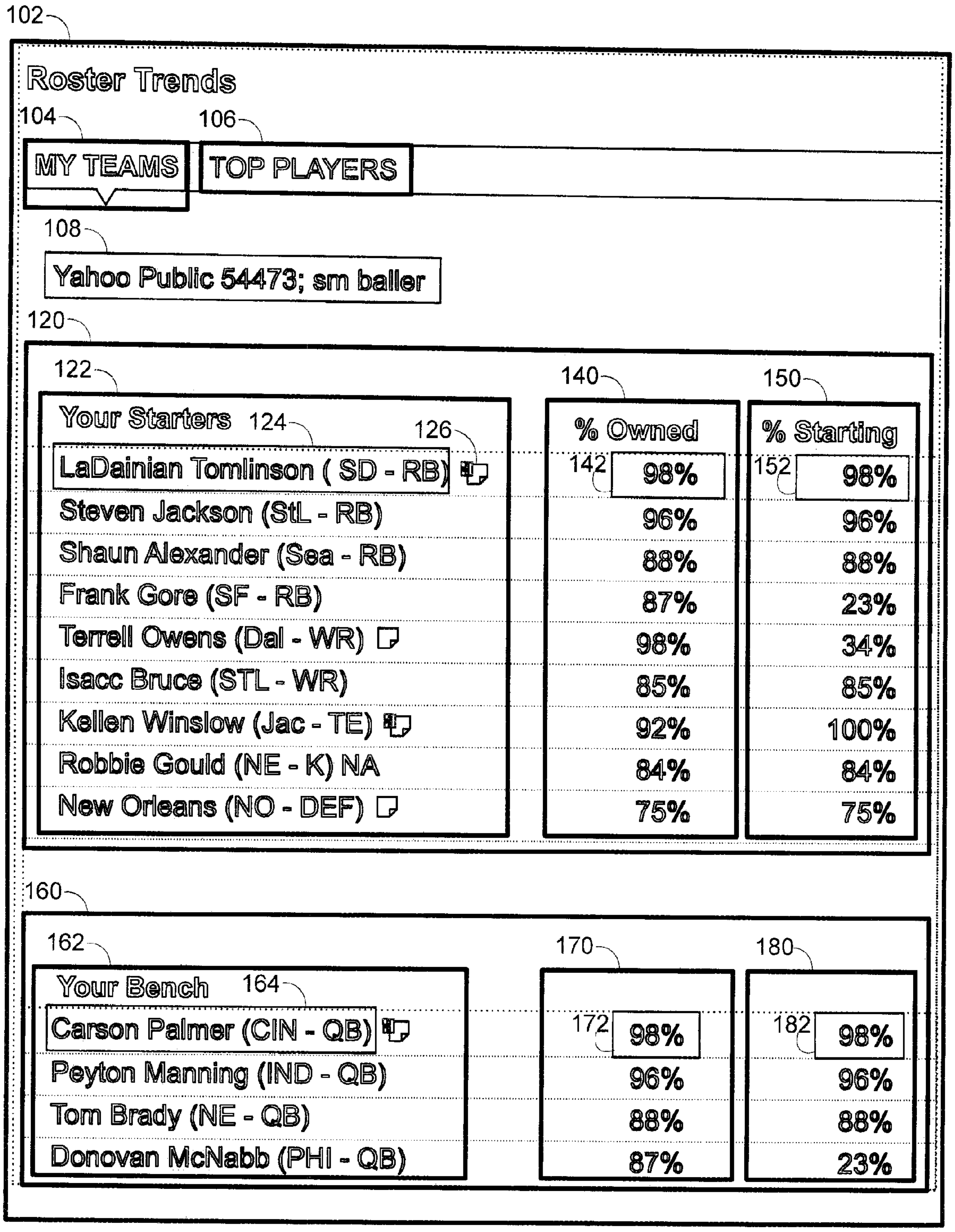
FIG. 1 illustrates a user interface for displaying fantasy sports team roster trends showing a user's starting players and benched players in accordance with embodiments of the invention.
Figure 4:
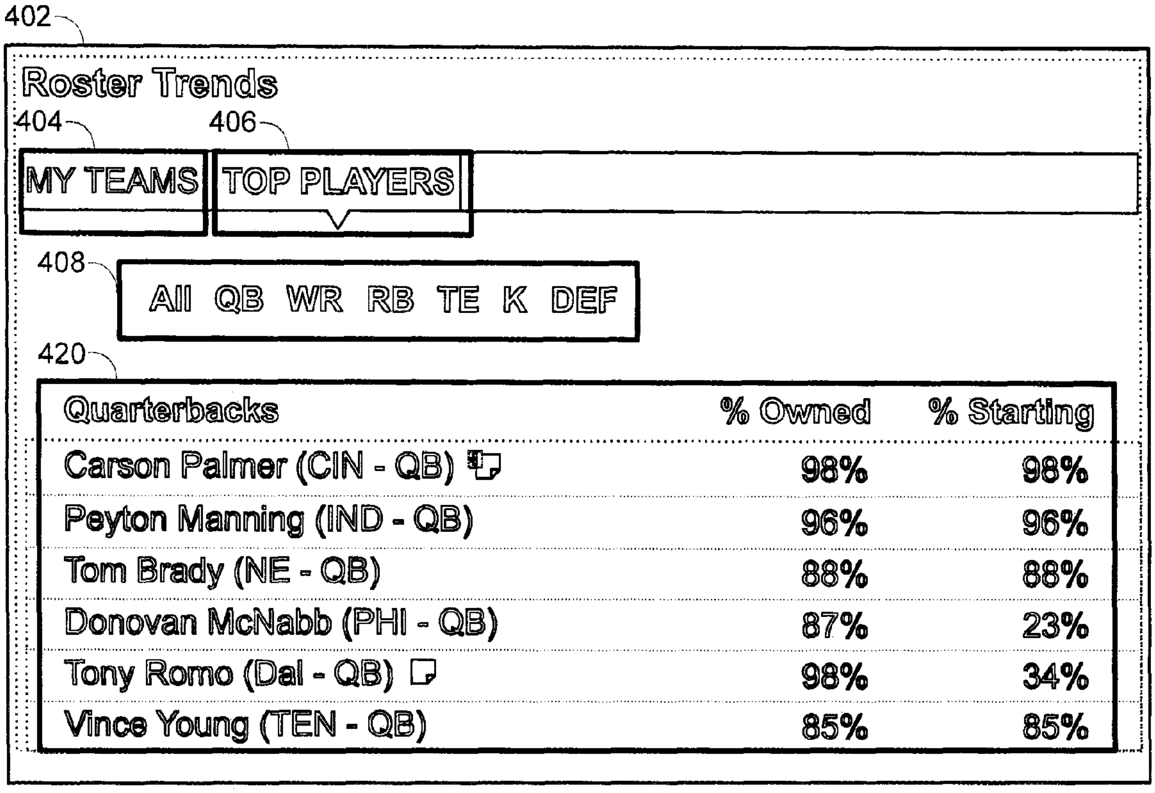
FIG. 4 illustrates a user interface for displaying fantasy sports team roster trends showing top players across multiple teams in accordance with embodiments of the invention.

FIG. 1 illustrates a user interface for displaying fantasy sports team roster trends showing a user's starting players and benched players, and FIG. 4 illustrates a user interface for displaying fantasy sports team roster trends showing top players across multiple teams in accordance with embodiments of the invention. A roster trends user interface 102 includes a user teams button or selection component 104, which a user can select to display a starting players table 120 listing statistics for players that are on the user's team(s), and a Top Players button or selection component 106, which a user can select to display top players data 420 listing the top, i.e., statistically highest-ranked, players in the fantasy sports game. Users who are logged in, i.e., who have provided a user ID and/or valid password, may view and interact with the starting players table 120. In one example, the starting players table 120 is the default view for the roster trends user interface 102 for logged-in users. The top players data 420 is available for viewing and interaction to both logged-in users and users who have not identified themselves. Therefore, the top players data 420 is the default view of the roster trends user interface 102 for users who are not logged in.

In one example, the roster trends user interface 102 is displayed on a web page for a video program related to fantasy sports games, e.g., a video show that presents advice on playing the fantasy sports game. The user interface 102 may also be displayed on a game home page or other web page. The roster trends user interface 102 may update or refresh the displayed statistical information, i.e., the statistic 142, at defined times. In one example, the defined times are periodic, e.g., every 1 minute, or every 5 minutes, or every 10 minutes. An update may cause the displayed starting players table 120 or top players data 420 to be recalculated to correspond to recent data, i.e., the state of the fantasy sports game as of the approximate time of the update, so that a rendition of the statistical information or value will be updated based upon recent data. That is, the displayed rendition of the statistic 142 is updated at one or more defined times, such as every 1 minute. At the defined times, the current value of the statistic is determined, and the current value is displayed. The update time, which is the time at which the current value is displayed, may be soon after the defined time of the update, e.g., 500 milliseconds, or 1 second, or 5 seconds after the update time because of computation delay and network delay. Therefore, because the update time may be soon after the defined time, the update time is based upon the one or more defined times.

In one example, a user may be associated with one or more fantasy sports teams. The user creates and manages these teams. Each team has a name and a list of players. In some sports, each player is associated with a sport-specific position, e.g., quarterback in football games, or pitcher in baseball games. Each player corresponds to a real-life player in that sport, e.g., quarterback Carson Palmer. The user may add each player to one or more of the user's teams. Other users may also add the player to one or more of their teams.

A player is said to be "on" a team if the player is a member of the team, i.e., the player is a member of the list of players that make up the team. Similarly, a player is said to be "owned" by a user if the player is a member of the list of players that make up any of the teams associated with (e.g., created or managed by) the user. That is, a user owns a player if the player is on at least one of the user's teams, i.e., if the user has the player on at least one of their teams. A team is said to be "owned" by a user if the user created and/or manages the team. The user plays the fantasy sports game by adding players to a team, removing players from the team, changing the positions of players on the team, and making other modifications to the team.

The list of players that make up the team is also referred to herein as a roster. A player on a team is associated with a status, which may be "starting" to indicate that the player is in the team's starting lineup, i.e., the player participates in fantasy sports games, and the performance of the player in real-life games affects the results of the fantasy sports games in which the player participates. A player's status may also be "benched" to indicate that the player is "on the bench," i.e., not eligible to score fantasy points. A user may activate or deactivate a player on one or more of the user's fantasy sports teams by setting the player's status to starting or benched, respectively. The user is said to "own" the fantasy sports teams that he or she manages in this way. Both starting and benched players are members of the team with which they are associated. A user may drop players from a team, in which case the dropped players are removed from the team. A team may have a minimum and/or maximum number of starting and/or benched players. For example, a baseball game may require 9 starting players, and may allow another 0 to 5 benched players.

In one example, if the identity of the user viewing the roster trends user interface 102 is known, e.g., the user is logged in, then the starting players table 120 is displayed by default and in response to selection of the user teams button or selection component 104. The user may also select the Top Players button or selection component 106 to view the top players data 420, which may, for example, be displayed in place of the starting players table 120 until the My Teams button is pressed again. In the My Teams display of the roster trends user interface 102, a description of the user's league (Yahoo Public) and the user's login name (sm baller) are displayed in a user information indicator 108. The My Teams display also includes the starters starting players table 120. In one example, the starters starting players table 120 is a player table that displays statistical information about the starting players on the user's team(s). The starting players table 120 includes a player description column 122 for displaying a description of each of the starting players on the user's team. The column 122 includes at least one player description 124. The description 124 may include the player's name, real-life team, sport-specific position in the game, and status. A sport-specific position may be a position that the player plays in the real-life sport upon which the fantasy sports game is based, e.g., quarterback or running back for football, or pitcher or catcher for baseball. A note icon 126 may be displayed adjacent to a player description 124. A user may select the note icon 126 to view information or news about the player 124. A user may select the player name portion of the description 124 to view information, e.g., statistics, about the player 124.

A percent owned column 140 displays a percent owned value 142, which is a statistic that indicates the percentage of fantasy sports teams in the fantasy sports game that have the player on their roster, i.e., the percentage of teams of which the player is a member and for which the player's status is "owned." A percent starting column 150 displays a percent starting value 152 that indicates the percentage of fantasy sports teams in the fantasy sports game that have the player on their starting roster, i.e., the percentage of teams of which the player is a member and for which the player's status is "starting." In one example, if the percent starting value is less than 50%, the value, or the row that includes the value, will be displayed in a red color, and if the percent starting value is greater than 50%, the value or row will be displayed in a green color.

In one example, the roster trends interface 102 displays statistical information about players by displaying at least one player description component 124 that displays at least a name of a fantasy sports player for viewing by a user. The interface 102 displays an indicator 132 for displaying a rendition of a statistic associated with the fantasy sports player, where the statistic is based upon a percentage of teams for which the player has a defined status in the fantasy sports game. The interface periodically refreshes the rendition of the statistic to display a recent value thereof, based on recent data. The rendition may be a text rendition, e.g., a number, a graphical rendition, e.g., a bar graph, or any other visual rendition of a numerical value. The defined status may be, for example, that the player is owned by the team, i.e., on the team, or that the player is a starter on the team (in which case the player may also be owned by the team). Therefore the statistic may be based upon a percentage of teams that own the player, where the percentage of teams is calculated as the number of teams that own the player, divided by the total number of teams in the fantasy sports game (or, in another example, the total number of teams in the user's fantasy sports league). In other examples, the total number of teams may be a total number of active teams, or a total number of teams with a particular attribute, such as a particular win/loss percentage, or teams that are in a particular category, e.g., beginning, intermediate, or advanced teams, or teams with a particular fee structure, e.g., free or with a paid subscription, or the like.

The statistic may also be based upon a percentage of teams for which the player is a starter. Therefore, if there are 10 teams in the fantasy sports game, and a player A is on 7 of the teams, then the statistic "percent owned" for player A is 70%. Furthermore, if player A is a starter on 5 of the teams, then the "percent starting" for player A is 50%. That technique is used to determine the players in the top players list 420. The players in the Your Starters list 122 and the Your Bench list 162 are determined similarly, but the set of players is restricted to the players that are starters, or benched players on the logged-in user's team(s), respectively. For example, if player A is a starter on a user's team, but player B is not on any of the user's teams, then A will be evaluated in the percent owned and percent starting calculations for the user, but B will not be. Furthermore, if A is a starter on the user's team named Cowboys, B is a starter on the users team named Patriots, and player C is not on any of the user's teams, then players A and B will be evaluated in the percent owned and percent starting calculations for the user, but C will not be.

In the example of FIG. 1, the percent owned value 142 for LaDainian Tomlinson 124 is 98%, which indicates that 98% of the teams in the fantasy sports game have LaDainian Tomlinson on their roster. Similarly, the percent starting value 152 for LaDainian Tomlinson is 98%, which indicates that 98% of the teams in the fantasy sports game have LaDainian Tomlinson in a starting position.

In one example, the My Teams display may include benched players data 160, which is an optional portion of the roster trends user interface 102. The benched players data 160 is calculated in the same way as the starting players table 120, except the players listed in the benched players data 160 are benched players, i.e., players that are on one or more of the user's teams, but that are not in a starting position. The benched player descriptions 162 list the descriptions of each benched player. For example, Carson Palmer 164 is a benched player on the user's team. The percent owned column 170 includes a numeric indicator 172 displaying the percentage of teams in the fantasy sports game that own Carson Palmer. The percent owned indicator 172 has the value 98%, which indicates that 98% of teams in the fantasy sports game own the corresponding player 164. The percent starting column 180 includes a numeric indicator 182 displaying the percentage of teams in the fantasy sports game that have Carson Palmer in a starting position. In one example, the percent starting value is not related to the percent owned value, except that the percent starting value is less than or equal to the percent owned value. Starting players are determined based on a user's active roster, and are listed in positional order.

The number of displayed players in the tables 120, 160 may be reduced to the top N players, where N is the number of rows that can be displayed in the list based on the screen size of the user interface 102. A scroll bar (not shown) may be provided in the user interface 102, e.g., alongside each of the tables 120, 160, so that any number of top players may be included in the tables 120, 160.

Although the examples presented herein show football players, the techniques described may be applied to players in any fantasy sports game, including, for example, baseball, hockey, golf, and automobile racing, to display the percentages of teams or users that are using particular players on a user's roster, and to display the top players across all teams in the game.

Figure 2:
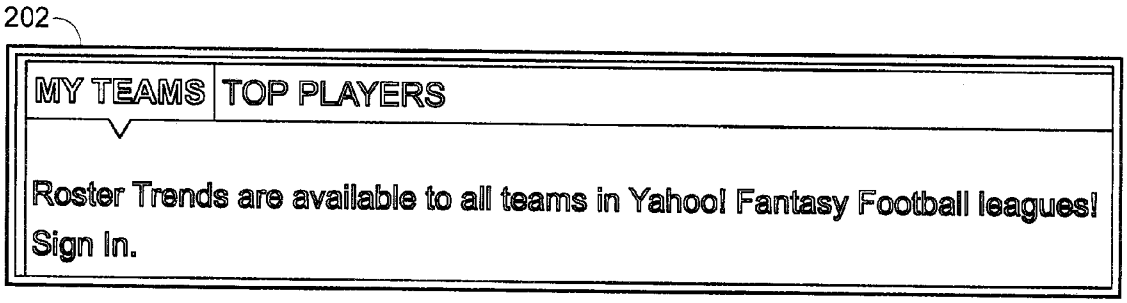
FIG. 2 illustrates a user interface for displaying fantasy sports team roster trends showing a sign in message in accordance with embodiments of the invention.

FIG. 2 illustrates a user interface for displaying fantasy sports team roster trends showing a sign-in message in accordance with embodiments of the invention. The sign-in message as shown in a roster trends user interface 202 appears when a user who is not logged in and has not provided any identification, or who is not a participant in the fantasy sports game, requests the My Teams information, e.g., by selecting the user teams button or selection component 104 of FIG. 1. In one example, the starting players table 120 is not displayed to a user in this case.

Figure 3:
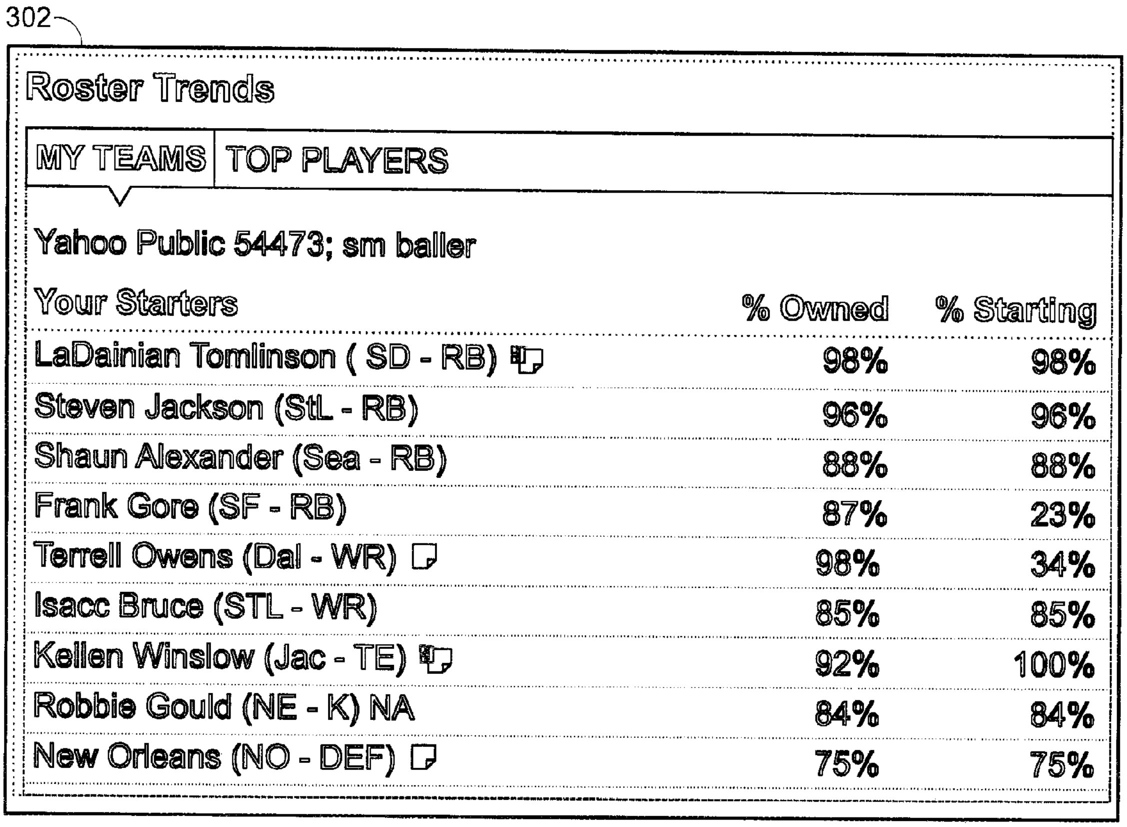
FIG. 3 illustrates a user interface for displaying fantasy sports team roster trends showing a user's starting players in accordance with embodiments of the invention.

FIG. 3 illustrates a user interface for displaying fantasy sports team roster trends showing a user's starting players in accordance with embodiments of the invention. FIG. 3 shows that the Bench table 160 is optional. A roster trends user interface 302 includes a starters table similar to the starting players table 120 of FIG. 1, but not a bench table.

FIG. 4 illustrates a user interface for displaying fantasy sports team roster trends showing top players across multiple teams in accordance with embodiments of the invention. A Top Players button or selection component 406 has been selected, and the top players in the fantasy sports game, as determined by the percentages of teams that own and start the players, are shown in the top players data 420. The players in the top players list 420 are selected from all, or substantially all, players in the fantasy sports game. A top player is, in one example, a player in a set of N players that have the N highest statistics according to some statistical measure, e.g., percentage of teams that own the player, or percentage of teams on which the player is a starter. The number N represents a cut-off point for the list of top players and may be a predetermined value, or may be determined based upon, for example, a size of a display window. For example, the top 10 players as measured by the percentage of teams on which the player is a starter, are the set of 10 players that have the 10 highest values of the percentage of teams on which the player is a starter. A sport-specific position selector 408 allows a user to select a sport-specific position, e.g., quarterback, so that only players in that position will be displayed in the top players list 420. As shown in FIG. 4, the QB (quarterback) selector 410 has been selected by the user, e.g., by clicking a mouse button, and only quarterbacks are shown in the list 420. If the All selector is selected, then the top players will be selected from all players, i.e., players in any position on any team.

In one example, the number of players displayed in the list 420 may be reduced to the top N players, where N is the number of rows that can be displayed in the list 420 based on the screen size of the user interface 402. A scroll bar (not shown) may be provided, so that any number of top players may be included in the list 420.

The My Teams button 404 returns to the user interface of FIG. 1 if the user is logged in, or shows the message of FIG. 2 if the user is not logged in.

Figure 5:
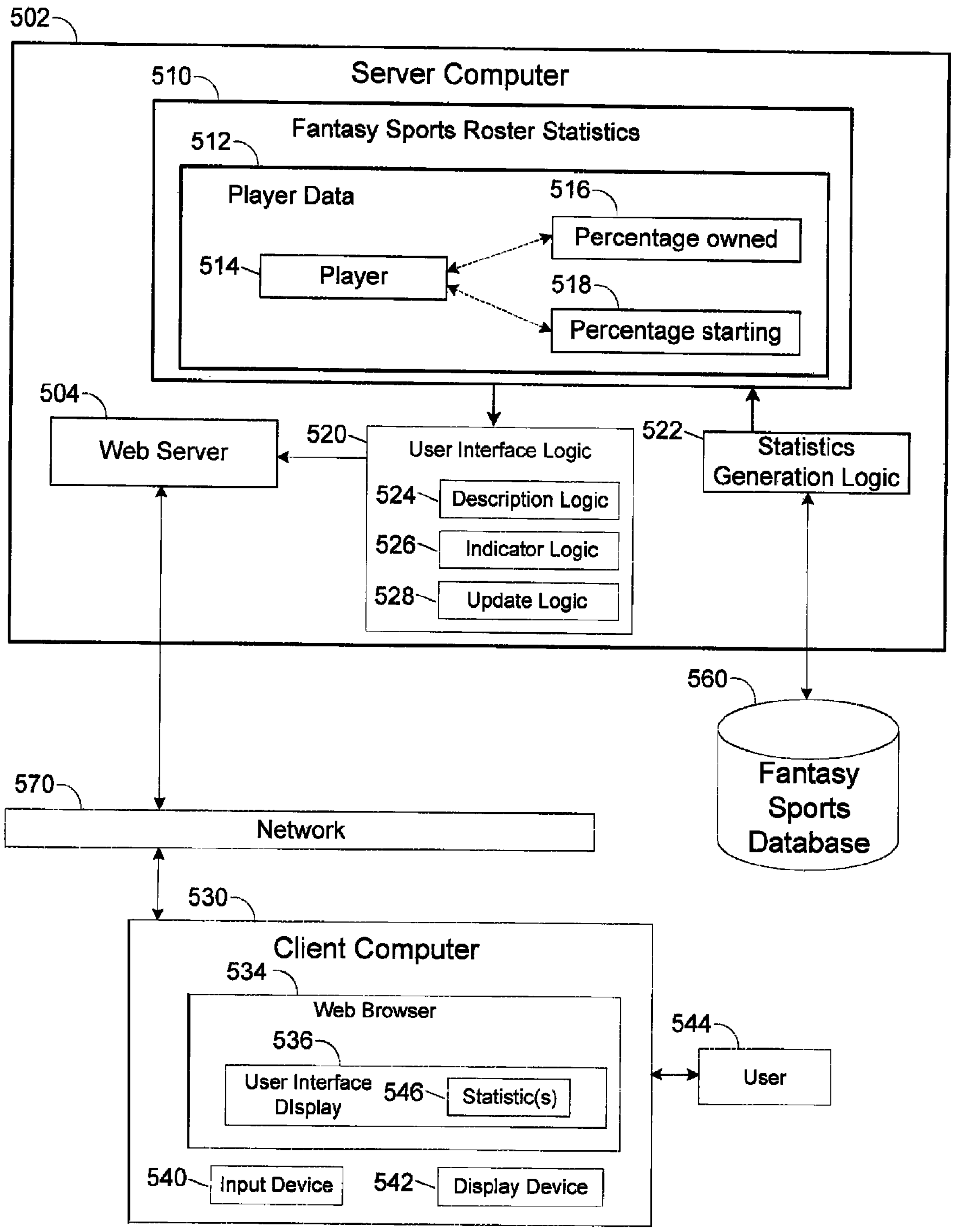
FIG. 5 illustrates a World Wide Web-based system for providing a fantasy sports player trends user interface in accordance with embodiments of the invention.

FIG. 5 illustrates a World Wide Web-based system for providing a fantasy sports player trends user interface in accordance with embodiments of the invention. A server computer 502 communicates with a client computer 530 via a network 570 such as, for example, the Internet. The server computer 502 includes user interface logic 520, which generates the user interfaces of FIGS. 1-4. The user interfaces of FIGS. 1-4 are presented in the web browser 534 as a user interface display 536 when appropriate, e.g., when a user 544 is viewing a web page that includes at least one of the user interfaces. The user interface display 536 interacts with the user via the input device 540 and the display device 542. The display 536 displays one or more displayed statistics 546, i.e., statistical values, such as the percent owned statistic 142 of FIG. 1. The displayed statistics 546 may be updated at defined times, e.g., periodically, to reflect the state of the fantasy sports game as time passes, as described above with reference to FIG. 1. In one example. the statistic(s) are displayed in association with player descriptions, e.g., player names, as shown in the table 120 of FIG. 1.

In one example, the user interface logic 520 includes description logic 524 for providing for display to a user one or more names of one or more players. The user interface logic 520 also includes indicator logic 526 for providing for display to the user a rendition of a statistic that is associated with the player(s). The rendition may be, for example, a number or a bar graph, as described above with respect to FIG. 1. The statistic is based upon a percentage of teams for which the player(s) have a defined status in the fantasy sports game. The status may be, for example, in a starting position, in a benched position, or owned by the team (i.e., either starting or benched). The statistic is calculated as a percentage of the total number of teams, where the percentage is the number of teams for which (i.e., on which) the player(s) have the status. The user interface logic 520 also includes update logic 528 for providing for update of the rendition of the statistic at one or more defined times (e.g., periodic times that occur at time intervals of defined length). The update logic provides for display of a value of the statistic, where the value is determined at the time of the update, and the time of the update is based upon the defined times. The update process further described above with respect to the user interface 102 of FIG. 1.

A web browser 534 located on the client computer 530 requests and receives web pages and web content from a web server 504 located on the server computer. The content data is transferred between the computers via the network 570. A web server 504 provides the user interface logic 520, which is transmitted to the client 530 via the network 570. The client 530 displays the user interface display portions 536 to the user 544 via the display device 542. The user 544 provides input via input device 540, and the input is sent back to the server 502.

The web server 504 interacts with the client device through which the client can communicate with the user interface logic 520 via, for example, HyperText Transport Protocol (HTTP) and HyperText Markup Language (HTML) data sent via the network 570, which may be, for example, the Internet. In one example, the web server 504 executes on the server computer to receive HTTP requests from the client computer via the network. The web server logic makes the HTTP requests available to the user interface logic 520 as input. Output produced by the user interface logic, e.g., a user interface display created in response to an HTTP request, is sent by the web server as an HTTP response to the client via the network. In other examples, the communication between the client and the server may be implemented by other protocols, known to those skilled in the art, such as, for example, XmlHttpRequest, Adobe® Flash®, or the like. The server logic such as the user interface logic 520 and statistics generation logic 522 may be implemented as computer program code in a programming language such as JavaScript™, Adobe® Flash®, Java®, or the like. The server logic may provide user interface components, e.g., HTML pages, JavaScript™ components, widgets implemented in JavaScript™ or another programming language. In one aspect, the user interface logic 520 may provide the specific user interfaces, including components such as text, maps, buttons, input fields, and widgets. The user interface logic 520 may transmit the user interfaces or portions thereof via the web server to the client application or browser located on the client. As a user 544 interacts with the user interface components 536 on the client, input data received from the user may be transmitted from the client to the server computer via the web server.

The statistics generation logic 522 generates fantasy sports roster statistics 510 on the server 502. The roster statistics 510 include a percentage owned 516 and a percentage starting 518 associated with a player 514. The statistics generation logic 522 accesses a fantasy sports database 560 to retrieve information about all teams for use in generating, e.g., by querying a database table for all teams, and for each team, determining if the player 514 is on the team according to roster data stored in the database. To determine the top players, the number of teams on which each player 514 is owned or starting can then be divided by the total number of teams (e.g., the number of rows in a table representing teams). To determine the top starters and benched players on a user's team, the statistics generation logic 522 may query the database 560 to retrieve the roster of players on the user's team(s), and then query the database 560 to determine the number of teams on which each player on the user's team(s) is a starter (or owned but not a starter). That number may then be divided by the total number of teams in the game to determine the percent starting (or percent owned) for that player.

The user interface logic 520 generates the user interface display 536 by retrieving the appropriate data, e.g., the fantasy sports roster statistics 510, formatting the data into a table, sorting the table, adding user interface components, and transmitting the user interface to the client computer 530 for display as the user interface display 536 in the web browser 534 or other application environment.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 6:
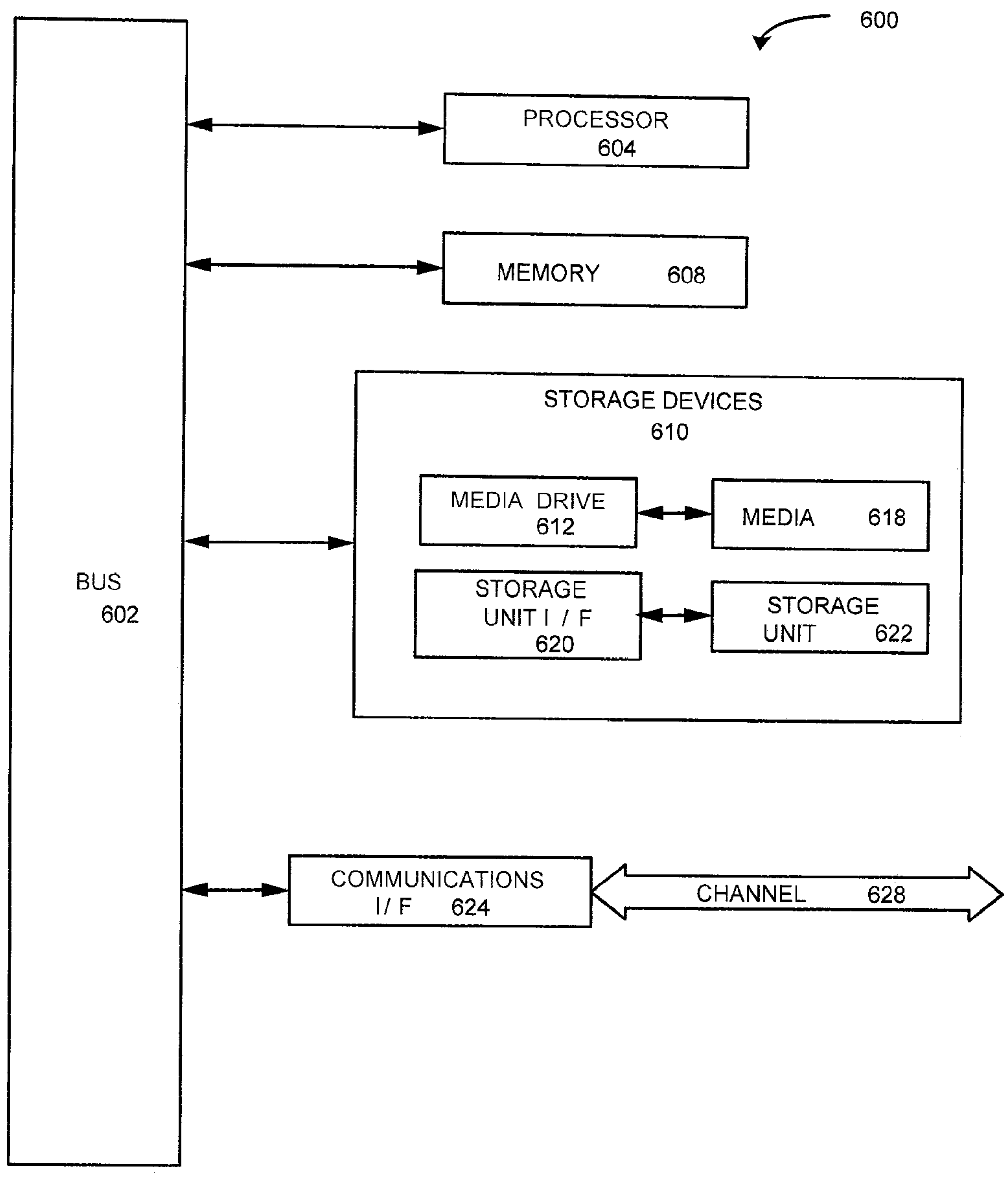
FIG. 6 illustrates a typical computing system that may be employed to implement processing functionality in embodiments of the invention.

FIG. 6 illustrates a typical computing system 600 that may be employed to implement processing functionality in embodiments of the invention. Computing systems of this type may be used in clients and servers, for example. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618, may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 608, storage device 618, or storage unit 622. These and other forms of computer-readable media may be involved in storing one or more instructions for use by processor 604, to cause the processor to perform specified operations. Such instructions, generally referred to as "computer program code" (which may be grouped in the form of computer programs or other groupings), when executed, enable the computing system 600 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An apparatus comprising:

a processor;

a storage medium for tangibly storing thereon program logic for execution by the processor, the program logic comprising:

statistics generation logic executed by the processor for providing for display to a user at least a name of at least one player from at least one team in an online fantasy sports game, the statistics generation logic determining a rendition of a plurality of statistics associated with the at least one player, a first statistic in the plurality of statistics based upon a plurality of fantasy sports teams that own the at least one player divided by a total number of teams in the online fantasy sports game with a predetermined win/loss percentage and a second statistic in the plurality based upon a plurality of fantasy sports teams that start the at least one player in their starting lineup, the statistics generation logic further determines the at least one player in a top players list if the at least one player is in a set of N players that have the N highest first statistic; and update logic executed by the processor for providing for an update of the rendition of the statistics at one or more defined times, the update logic calculating a value of the statistics determined at an update time, the update time based upon the one or more defined times.

2. The apparatus of claim 1, wherein each of the plurality of statistics corresponds to a percentage of fantasy sports teams.

3. The apparatus of claim 1, wherein the at least one player is selected from all teams in the fantasy sports game.

4. The apparatus of claim 1, further comprising:

sport-specific position selector logic executed by the processor for receiving selection of a selected sport-specific position, wherein the statistics generation logic is configured to provide for display the at least one player in the top players list if the at least one player's sport-specific position corresponds to the selected sport-specific position.

5. The apparatus of claim 1, wherein the statistics generation logic is configured to provide for display the top players list in response to selection of a top players selection component.

6. The apparatus of claim 1, wherein the at least one description component is displayed as at least one row in a table, the at least one row includes at least one of the statistics, and the table is displayed in sorted order, wherein the table is sorted by the at least one statistic.

7. The apparatus of claim 1, wherein a login identity is associated with the user, the login identity is associated with at least one fantasy sports team of the user, and the at least one player is a member of the at least one fantasy sports team of the user.

8. The apparatus of claim 7, wherein the user is logged in to the online fantasy sports game.

9. The apparatus of claim 7,wherein the statistics generation logic is operable to provide for display the at least one player in a starting players list if the at least one player is in a starting lineup of the at least one fantasy sports team of the user.

10. The apparatus of claim 9, wherein the statistics generation logic is configured to provide for display the at least one player in a benched players list if the at least one player has a benched status on the at least one fantasy sports team of the user.

11. The apparatus of claim 10, wherein the statistics generation logic is configured to provide for display the starting players list, the benched players list, or a combination thereof, in response to selection of a top players selection component.

12. The apparatus of claim 1, wherein the first statistic comprises a percent owned value, and the percent owned value is based upon a percentage of teams that have the at least one player on their roster.

13. The apparatus of claim 12, wherein the percent owned value is calculated as the number of teams that have the at least one player on their roster divided by the number of teams in the fantasy sports game.

14. The apparatus of claim 1, wherein the second statistic comprises a percent starting value, and the percent starting value is based upon a percentage of teams that have the at least one player in a starting position.

15. The apparatus of claim 14, wherein the percent starting value is calculated as the number of teams that have the at least one player in a starting position divided by the number of teams in the fantasy sports game.

16. The apparatus of claim 1, further comprising:

user teams selector logic executed by the processor for causing the apparatus to display the at least one description and associated first statistic if the corresponding player is on a team owned by the user; and top players selection logic executed by the processor for causing the apparatus to display the at least one description and associated statistic if the corresponding player is a top player.

17. The apparatus of claim 1, further comprising note presentation logic executed by the processor for displaying a note component visually associated with the name of at least one player, wherein the note presentation logic is operable to provide for display information describing the at least one player in response to user selection of the note component.

18. An apparatus comprising:

a processor;

a storage medium for tangibly storing thereon program logic for execution by the processor, the program logic comprising:

statistics generation logic executed by the processor for determining a player table comprising at least one row, wherein the at least one row represents at least one player selected from at least one team in a fantasy sports game, the at least one row comprises at least one column, and the at least one column comprises:

a description column for displaying a description of the at least one player, wherein the description comprises at least a name of the at least one player; and a plurality of indicators for determining a rendition of a plurality of statistics associated with the at least one player, a first statistic in the plurality based upon a plurality of fantasy sports teams that own the at least one player divided by a total number of teams in the fantasy sports game with a predetermined win/loss percentage and a second statistic in the plurality based upon a plurality of fantasy sports teams that start the at least one player in their starting lineup; and update logic executed by the processor for providing for update of the rendition of the statistics at one or more defined times, the update logic calculating values of the statistics determined at an update time, wherein the update time is based upon the one or more defined times, wherein the statistics generation logic is configured to provide for display the at least one player in a top players list if the at least one player is in a set of N players that have the N highest first statistic.

19. The apparatus of claim 18, wherein each of the plurality of statistics corresponds to a percentage of fantasy sports teams.

20. The apparatus of claim 18, wherein the second statistic corresponds to a percentage of fantasy sports teams that have the at least one player on their starting roster.

21. The apparatus of claim 18, wherein the statistics generation logic is configured to sort the at least one row of the player table by at least one of the statistics.

22. The apparatus of claim 18, wherein the player table comprises a starters table, the starters table comprises at least one starter row, and the at least one starter row represents a corresponding fantasy player that is in a starting position on at least one team associated with a logged-in user.

23. The apparatus of claim 22, wherein the player table further comprises a bench table, the bench table comprises at least one bench row, and the at least one bench row represents a corresponding fantasy player that is in a bench position on at least one team associated with the logged in user.

24. The apparatus of claim 18, wherein the at least one player is selected from all teams in the fantasy sports game.

25. The apparatus of claim 18, further comprising:

sport-specific position selector logic executed by the processor for receiving selection of a selected sport-specific position, wherein the statistics generation logic is configured to provide for display the at least one player in the top players list if the at least one player's sport-specific position corresponds to the selected sport-specific position.

26. A non-transitory computer-readable storage medium comprising instructions stored thereon and executed by a processor for displaying statistical information about players in an online fantasy sports game, the instructions for:

determining, by the processor, at least one description component that includes at least a name of at least one player selected from at least one team in the fantasy sports game for viewing by a user;

determining, by the processor, a rendition of a plurality of statistics associated with the at least one player, a first statistic in the plurality based upon a plurality of fantasy sports teams that own the at least one player divided by a total number of teams in the fantasy sports game with a predetermined win/loss percentage and a second statistic in the plurality based upon a plurality of fantasy sports teams that start the at least one player in their starting lineup; and determining, by the processor, an update of the rendition of the statistics at one or more defined times by providing for display a value of the statistic determined at an update time, wherein the update time is based upon the one or more defined times, wherein the determining of a rendition of a plurality of statistics further comprises determining the at least one player in a top players list if the at least one player is in a set of N players that have the N highest first statistic.

27. The non-transitory computer-readable storage medium of claim 26, wherein each of the plurality of statistics corresponds to a percentage of fantasy sports teams.

28. The non-transitory computer-readable storage medium of claim 26, wherein the at least one player is selected from all teams in the fantasy sports game.

29. The non-transitory computer-readable storage medium of claim 26, further comprising instructions for:

receiving selection of a selected sport-specific position; and displaying the at least one player in the top players list if the at least one player's sport-specific position corresponds to the selected sport-specific position.

30. The non-transitory computer-readable storage medium of claim 26, further comprising instructions for displaying the top players list in response to selection of a top players selection component.

31. The non-transitory computer-readable storage medium of claim 26, wherein the at least one description component is displayed as at least one row in a table, the at least one row includes one or more of the plurality of statistics, and the table is displayed in sorted order, wherein the table is sorted by one of the statistics.

32. The non-transitory computer-readable storage medium of claim 26, wherein a login identity is associated with the user, the login identity is associated with at least one fantasy sports team of the user, and the at least one player is a member of the at least one fantasy sports team of the user.

33. The non-transitory computer-readable storage medium of claim 32, wherein the user is logged in to the online fantasy sports game.

34. The non-transitory computer-readable storage medium of claim 32, further comprising instructions for displaying the at least one player in a starting players list if the at least one player is in a starting lineup of the at least one fantasy sports team of the user.

35. The non-transitory computer-readable storage medium of claim 34, further comprising instructions for displaying the at least one player in a benched players list if the at least one player has a benched status on the at least one fantasy sports team of the user.

36. The non-transitory computer-readable storage medium of claim 35, further comprising instructions for displaying the starting players list, the benched players list, or a combination thereof, in response to selection of a top players selection component.

37. The non-transitory computer-readable storage medium of claim 26, wherein the first statistic comprises a percent owned value, and the percent owned value is based upon a percentage of teams that have the at least one player on their roster.

38. The non-transitory computer-readable storage medium of claim 37, wherein the percent owned value is calculated as the number of teams that have the at least one player on their roster divided by the number of teams in the fantasy sports game.

39. The non-transitory computer-readable storage medium of claim 26, wherein the second statistic comprises a percent starting value, and the percent starting value is based upon a percentage of teams that have the at least one player in a starting position.

40. The non-transitory computer-readable storage medium of claim 39, wherein the percent starting value is calculated as the number of teams that have the at least one player in a starting position divided by the number of teams in the fantasy sports game.

41. The non-transitory computer-readable storage medium of claim 26, further comprising instructions for:

causing display of the at least one description and associated first statistic if the corresponding player is on a team owned by the user; and causing display of the at least one description and associated statistic in the plurality of statistics if the corresponding player is a top player.

42. The non-transitory computer-readable storage medium of claim 26, further comprising instructions for:

displaying a note component visually associated with the name of at least one player; and displaying information describing the at least one player in response to user selection of the note component.

43. A non-transitory computer-readable storage medium comprising instructions stored thereon and executed by a processor for displaying statistical information about players in an online fantasy sports game, the instructions for:

determining, by the processor, a player table comprising at least one row, wherein the at least one row represents at least one player selected from at least one team in the fantasy sports game, the at least one row comprises at least one column, and the at least one column comprises:

a description column for determining a description of the at least one player, wherein the description comprises at least a name of the at least one player; and a plurality of indicators for determining a rendition of a plurality of statistics associated with the at least one player, a first statistic in the plurality based upon a plurality of fantasy sports teams that own the at least one player divided by a total number of teams in the fantasy sports game with a predetermined win/loss percentage and a second statistic in the plurality based upon a plurality of fantasy sports teams that start the at least one player in their starting lineup; and determining, by the processor, an update of the rendition of the statistics at one or more defined times by providing for display a value of the statistics determined at an update time, wherein the update time is based upon the one or more defined times, wherein the determining of the player table further comprises causing display of the at least one player in a top players list if the at least one player is in a set of N players that have the N highest first statistic.

44. The non-transitory computer-readable storage medium of claim 43, wherein each of the plurality of statistics corresponds to a percentage of fantasy sports teams.

45. The non-transitory computer-readable storage medium of claim 43, wherein the second statistic corresponds to a percentage of fantasy sports teams that have the at least one player on their starting roster.

46. The non-transitory computer-readable storage medium of claim 43, further comprising instructions for sorting the at least one row of the player table by at least one of the statistics.

47. The non-transitory computer-readable storage medium of claim 43, wherein the player table comprises a starters table, the starters table comprises at least one starter row, and the at least one starter row represents a corresponding fantasy player that is in a starting position on at least one team associated with a logged-in user.

48. The non-transitory computer-readable storage medium of claim 47, wherein the player table further comprises a bench table, the bench table comprises at least one bench row, and the at least one bench row represents a corresponding fantasy player that is in a bench position on at least one team associated with the logged in user.

49. The non-transitory computer-readable storage medium of claim 43, wherein the at least one player is selected from all teams in the fantasy sports game.

50. The non-transitory computer-readable storage medium of claim 43, further comprising instructions for:

receiving selection of a selected sport-specific position; and displaying the at least one player in the top players list if the at least one player's sport-specific position corresponds to the selected sport-specific position.

51. A computing device comprising a processor and a display, the processor executing instructions to display an interface on the display, the interface for displaying statistical information about players in an online fantasy sports game, the interface comprising:

a statistics generator for determining, by the processor, at least one description component that comprises at least a name of at least one player for viewing by a user, wherein the statistics generator is further operable to provide indicators for determining a rendition of a plurality of statistics associated with the at least one player, a first statistic in the plurality of statistics based upon a plurality of fantasy sports teams that own the at least one player divided by a total number of teams in the online fantasy sports game with a predetermined win/loss percentage and a second statistic in the plurality based upon a plurality of fantasy sports teams that start the at least one player in their starting lineup; and an update component for determining, by the processor, an update of the rendition of the statistics at one or more defined times, wherein the update component is operable to calculate a value of the statistics determined at an update time, wherein the update time is based upon the one or more defined times, wherein the statistics generator is further for determining the at least one player in a top players list if the at least one player is in a set of N players that have the N highest first statistic.

52. The computing device of claim 51, wherein each of the plurality of statistics corresponds to a percentage of fantasy sports teams.

53. The computing device of claim 51, wherein the statistics generation component is configured to provide the at least one description component for display as at least one row in a table, the at least one row includes at least one statistic in the plurality, and the table is displayed in sorted order, wherein the table is sorted by the at least one statistic.

* * * * *